Dec. 8, 1964   J. N. SCOTT, JR., ET AL   3,159,878
INJECTION MOLDING OF PLASTIC MATERIALS
Filed Sept. 14, 1961

INVENTORS
J. N. SCOTT, JR.
D. L. PETERS
BY Hudson and Young
ATTORNEYS

United States Patent Office 3,159,878
Patented Dec. 8, 1964

3,159,878
INJECTION MOLDING OF PLASTIC MATERIALS
John N. Scott, Jr., and Donald L. Peters, Bartlesville, Okla., assignors to Phillips Petroleum Company, a corporation of Delaware
Filed Sept. 14, 1961, Ser. No. 138,033
3 Claims. (Cl. 18—30)

This invention relates to the injection molding of thermoplastic materials. In one aspect it relates to injection molding apparatus having associated therewith a mold which includes an insulated runner system and a valving mechanism for maintaining a back pressure on the material in the insulated runner system. In another aspect the invention relates to a method for reducing the period of time required to fill a cold mold cavity.

Conventional molding apparatus of the injection type usually includes an injection or heating cylinder which includes an injection plunger or cylinder. The injection plunger reciprocates in the bore of the heating cylinder in such a manner as to permit the solid plastic material to be molded to enter the cylinder on the withdrawal stroke of the plunger. On the compression stroke of the plunger, the plastic material, now in a molten state, is forced from the heating cylinder through a nozzle and thence through a runner system into the mold cavities.

The two types of molds generally used in injection molding apparatus are commonly designed as 3-plate molds and hot runner molds. Both of these types have very definite disadvantages, the elimination of which is made possible by the present invention. While of the two types of molds the 3-plate mold is considerably less expensive to construct, its cold runner system freezes off during each cycle of operation, i.e., upon the completion of each shot the plastic material solidifies in the runner system. As a result, the solidified material must be removed from the runner system before proceeding with the next shot. Therefore, with 3-plate molds, cycle times are comparatively long, materials are wasted, and any attempt to control the operation automatically is greatly complicated.

As compared to the 3-plate mold, a hot runner mold is very expensive to construct. Also, several hours are often required to line out the apparatus on a stable cycle because of temperature equilibrium difficulties encountered in balancing the mold gate cooling against the runner heat. Additional problems present in a hot runner mold operation arise because of the frequent occurrence of hot spots in the mold which cause warpage and gate brittleness of the molded article. However, in spite of these disadvantages, hot runner systems are often preferred, particularly where the production of a large quantity of items is involved. In our copending application Serial No. 29,411, filed May 16, 1960, we have disclosed a novel molding apparatus wherein a runner system is provided having a cross-sectional area sufficient to accommodate a wall of solidified thermoplastic material which acts as insulation for the central core of molten thermoplastic being forced through the runner system to the mold cavity and wherein the gate which communicates between the insulated runner and the mold cavity is extremely short so that the sprue on the molded article is so small that no trimming of the molded article is required. The present invention is an improvement over that disclosed in the above copending application.

It is an object of this invention to provide a valving mechanism for use in injection molding apparatus to prevent molten material from entering the mold cavity until a preset pressure is reached. It is also an object of this invention to provide a valve to control the admission of molten material to a mold cavity wherein the valve is in the removable portion of the injection molding apparatus. It is also an object of this invention to provide a valve for closing the gate from the runner system of an injection molding apparatus wherein the working parts of the valve are not in contact with the molten thermoplastic material. Still another object of this invention is to provide a method for controlling the back pressure maintained on molten thermoplastic material in the runner system of injection molding apparatus. Another object of the invention is to provide a method for preventing entry of molten thermoplastic material to a mold cavity until sufficient pressure has been built up on the molten thermoplastic so that the mold cavity is filled with molten thermoplastic in the shortest time practical. Other objects and advantages of the invention will be apparent to one skilled in this art upon study of the disclosure including the detail description of the invention and the appended drawing wherein:

Figure 3:
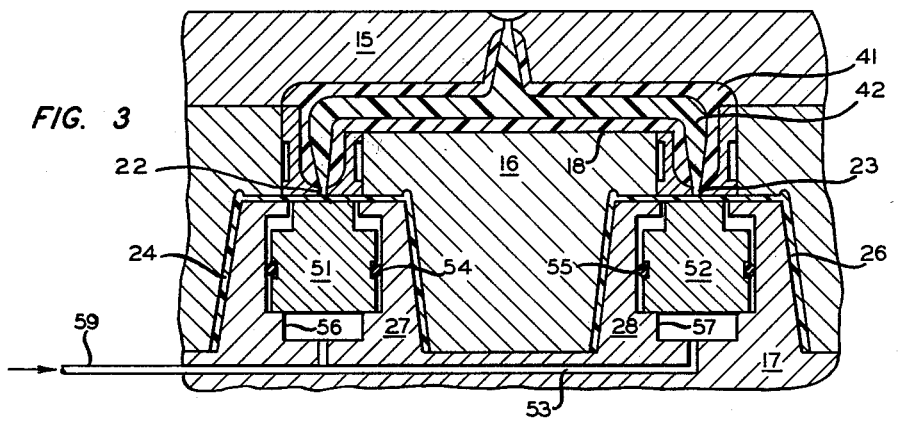
FIGURE 3 is a view of the valved runner system of FIGURE 2 wherein the valve is open.

Broadly, the invention contemplates a valve for precompression of material to be injection molded which comprises a piston operated from the mold core by a predetermined pressure derived from fluid pressure, spring pressure, solenoid pressure, and the like, so that the piston seats over the gate in the opposite mold cavity path until sufficient pressure is built up in the runner system to overcome the pressure on the piston and push it out of the cavity and flush with the mold cavity wall to allow filling of the mold cavity. As pressure builds up in the runner system, the total force against the piston is relatively low because of the small area of the piston exposed to the molten plastic through the runner gate. Once the "opening" pressure is reached, the piston will be pushed back exposing a much larger piston area and thereby increasing the force against the piston so that there is substantially no resistance to entry of the molten thermoplastic into the mold cavity once the valve is open.

The materials which are molded in accordance with the present invention can be broadly defined as being thermoplastic synthetic resins. The invention is particularly applicable to materials which can be defined as high density, highly crystalline solid polymers, although low density, low crystallinity polymers can also be employed. The high density, highly crystalline solid polymers often have an inherent viscosity of at least 0.8, preferably an inherent viscosity between 1.2 and about 10, as determined from a solution of 0.2 gram of polymer in 50 cc. of tetralin at 130° C. The polymers also have a crystallinity of at least 70 percent, preferably at least 80 percent, and more desirably at least 90 percent, at 25° C. The crystallinity of the polymers can be determined by measurements of nuclear magnetic resonance (Wilson and Pake, Journal of Polymer Science, 10, 503 (1953)), using a sample of polymer which is in a state approaching equilibrium at 25° C. An approach to this equilibrium state can be achieved by heating the polymer sample to a temperature about 50° C. above its crystalline melting point, maintaining the sample at this temperature for about one hour, and then cooling to 25° C. at a rate characterized by fall of about 1.5° C. per minute at 135° C. The crystallinity can also be determined according to the method of Matthews, Peiser and Richards, Acta Crystallographica, 2, 85 (1949). The softening point of the polymer will vary with the particular polymer used, increasing as the density and crystallinity of the polymer increases. Generally, the softening point of the high density solid polymer is about 250° F., preferably in the approximate range of 250 to 300° F., and is several degrees higher, e.g., about 10° F., than the melting point of the polymer.

Highly crystalline polymers having the above-described properties are preferably produced by the method described in U.S. Patent 2,825,721 of J. P. Hogan and R. L. Banks, issued on March 4, 1958. As described in detail in the Hogan and Banks patent, the polymers to be molded in accordance with the present invention can be produced by contacting an aliphatic 1-olefin with a catalyst comprising as its essential ingredient from 0.1 to 10 or more weight percent chromium in the form of chromium oxide, preferably including a substantial amount of hexavalent chromium. The chromium oxide is ordinarily associated with at least one other oxide, particularly at least one oxide selected from the group consisting of silica, alumina, zirconia, and thoria. It is preferred that the plastic materials which are to be molded in accordance with this invention be polymers of ethylene or propylene or mixtures of ethylene and other unsaturated hydrocarbons, e.g., mixtures of ethylene with minor amounts of monoolefins containing up to and including 6 carbon atoms per molecule, such as propylene, 1-butene and 1-pentene.

While it is preferred to use in the practice of this invention polymers produced in accordance with the Hogan and Banks process, it is to be understood that polymers produced by other methods can also be employed. For example, a polymer which can be advantageously used can be produced by contacting an olefin, such as ethylene or propylene, with a catalyst comprising a mixture of an organometallic compound, such as an aluminum trialkyl, and a halide of a Group IV metal of the periodic table, such as titanium tetrachloride. In another method for producing a suitable polymer, an olefin, such as ethylene, is polymerized in the presence of a catalyst comprising an organometallic halide, such as ethylaluminum dichloride, and a halide of a Group IV metal, such as titanium tetrachloride. Although it is usually preferred to utilize the above-mentioned polymers, it is to be realized that the invention is broadly applicable to the molding of thermoplastic materials and that polymers such as polystyrene, polyvinyl chloride, copolymers of vinyl chloride and vinylidene chloride, nylon, and the like, can be utilized in the practice of the invention.

A more complete understanding of the invention can be obtained by referring to the drawing wherein like elements will be referred to by like numerals in the various figures.

Figure 1:
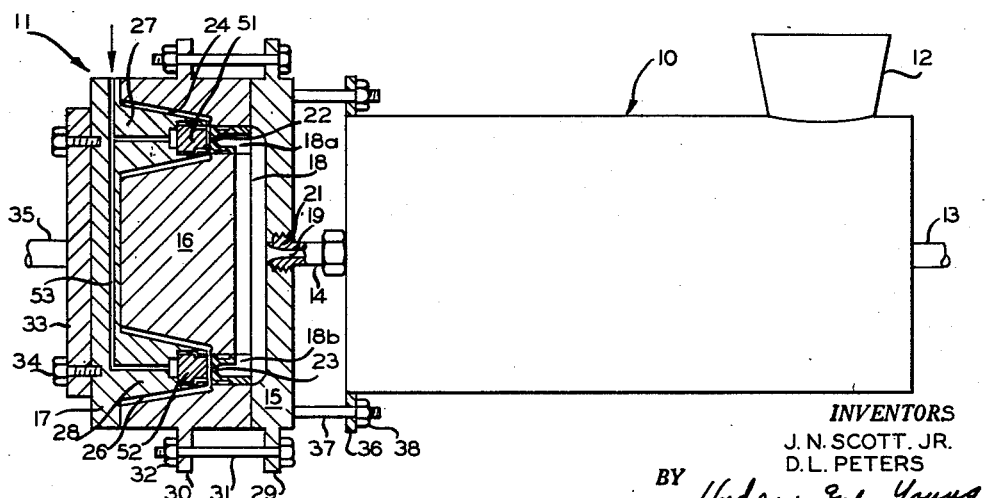
FIGURE 1 is an elevational view, partly in section, of an injection molding apparatus having embodied therein the valved runner system of this invention.

Referring now to FIGURE 1, an injection molding apparatus is shown as an elevational view, partly in section, and includes two principal components, namely heating or injection cylinder 10 and mold 11. The solid plastic material, usually in granular form is introduced into heating cylinder 10 through hopper 12. The heating cylinder includes a heating means (not shown) for converting the solid plastic material to a molten condition. A plunger 13 reciprocates in the bore of the heating cylinder thereby providing means for discharging the molten material through nozzle 14. Heating cylinder plunger 13 is usually connected to a hydraulic system (not shown) which provides means for moving the plunger in the bore of the heating chamber. It is to be understood that it is not intended to limit the present invention to a heating chamber or discharge nozzle of any particular construction since any suitable heating chamber or discharge nozzle can be employed.

Mold 11 comprises three principal components which, for convenience of description, are designated as runner section 15, cavity section 16 and core section 17. These three sections correspond to the plates from which a 3-plate mold derives its name. Identical grooves or channels are formed in adjacent surfaces of the runner and cavity sections so that when the runner and cavity sections are placed together, as shown in the drawing these grooves coincide and form the runner or passageway 18. The particular runner illustrated is in the shape of a straight tube having the ends turned at an angle of 90° so as to form the leg sections indicated as 18a and 18b; however, it is to be understood that runners having configurations other than that illustrated and described come within the scope of this invention. For example, it is within the purview of the invention to employ a runner which is in the form of a circular tube or torus having a plurality of depending leg sections such as shown at 18a and 18b.

Connecting the discharge opening in nozzle 14 to runner 18 is sprue or passageway 19. While sprue 19 is shown as being formed in insert member 21, which is threaded into runner section 15, it is to be realized that the runner section can be so machined that the sprue is an integral part of that section. Sprues or gates 22 and 23, formed in the cavity section 16, connect the runner with the mold space between the walls of cavities 24 and 26 and the surfaces of cores 27 and 28. The sprue openings into these spaces are usually referred to as the mold gates. While the mold is illustrated as including a cavity section and two cavities, it is to be understood that the invention is applicable to a mold having any desired number of cavities. Pistons 51 and 52 are positioned within the cores 27 and 28 so as to form a closure for gates 22 and 23 when in extended position and to form a wall of the mold cavities 24 and 26 when in retracted position. Pistons 51 and 52 are operated by fluid pressure introduced through manifold 53 from a pressure source, not shown.

The mold of the injection molding apparatus includes means whereby the runner, cavity and core sections can be maintained securely in position with respect to one another as well as with heating chamber 10. Thus the runner and cavity sections are provided with flanges 29 and 30. Bolts 31, having nuts 32 threaded on their ends, extend through these flanges so that runner section 15 and cavity section 16 can be locked securely together. It is to be understood that any suitable clamping device can be used to hold these two sections in position. A plate 33 is attached to core section 17 by means of bolts 34 which pass through the plate and threadably engage the core section. Connected to plate 33 is a connecting rod 35 having at its other end a hydraulic piston which rides in a hydraulic cylinder (not shown). By means of this latter arrangement of apparatus, the core section is maintained in position against the cavity section during the molding step of the cycle of operation. Upon completion of the steps of filling the mold with molten plastic and cooling sufficiently to harden the molded object, the core section is withdrawn by means of the hydraulic piston so that the molded articles can be removed from the cavities.

Heating chamber 10 is also provided with flange members 36 having openings therein in which bolts 37 ride. One end of these bolts is fixedly attached, as by welding or threaded engagement, to runner section 15 while the other end is threaded to receive nuts 38. By this arrangement of apparatus, the mold is maintained in position with respect to the heating chamber with the discharge end of nozzle 13 in communication with sprue 19.

Figure 2:
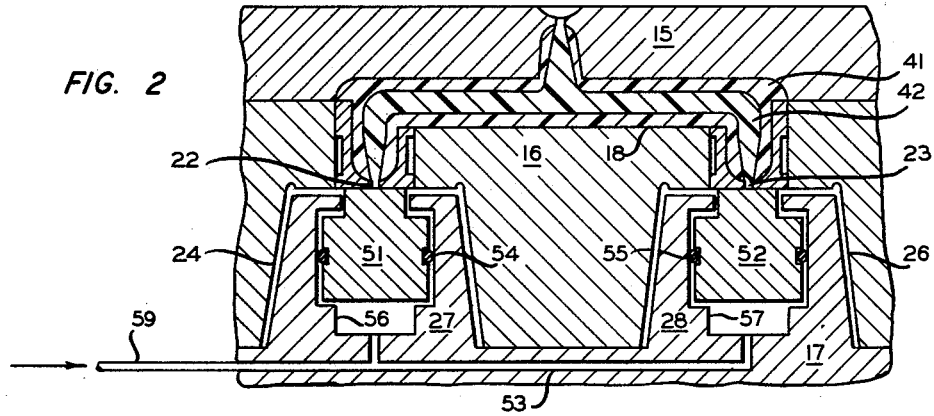
FIGURE 2 is a detail view of one embodiment of the valved runner system of the invention wherein the valve is closed.

Referring now to FIGURE 2, the mold section of FIGURE 1 is shown in greater detail. The runner system is shown as filled with thermoplastic material, the area indicated at 41 being solidified thermoplastic material which acts as the insulation for the runner and the portion indicated at 42 representing the molten thermoplastic contained in the runner 18. Pistons 51 and 52 are shown in extended position so as to close the gates 22 and 23 and prevent flow of molten thermoplastic material into the mold cavities 24 and 26. Fluid pressure such as compressed air enters manifold 52 via conduit 59. O-rings 54 and 55 provide a seal between the pistons 51 and 52 and the walls of the cylinders formed in cores 27 and 28. Shoulders 56 and 57 limit the travel of pistons 51 and 52 when these pistons are retracted by the pressure on the molten thermoplastic so that the faces of the pistons 51 and 52 are flush with the surface of the cores 27 and 28 thereby forming a portion of the wall of the mold cavity.

FIGURE 3 shows the system of FIGURE 2 wherein the pressure on the molten thermoplastic has pushed the pistons 51 and 52 away from gates 22 and 23 and against the shoulders 56 and 57 so that the mold cavities 24 and 26 are filled with molten thermoplastic material.

In the operation of the method and means of the invention thermoplastic material is compressed in the runner 18 until the force acting upon the plunger 13 becomes greater than the preset pressure applied to pistons 51 and 52. The valves which are formed by pistons 51 and 52 bearing against gates 22 and 23 are opened and the force is then applied to the entire end surface of the pistons instead of an area defined by the gate opening so that there is a great reduction in the resistance to the force exerted by the plunger 13 and the molten material is passed into the mold cavity very rapidly. This sudden filling of the mold cavity overcomes any tendency for the molten material to harden prematurely and form a bridge with the resulting occurrence of a void in the molded article. Furthermore, the molten material is cooled more uniformly with the result that the tendency for setting up internal strains is greatly reduced. Warping and stress cracking of the molded articles are therefore minimized.

The preset pressure applied to the pistons 51 and 52 can be supplied by fluid pressure, coil springs, solenoids and the like. Air pressure is often preferred because of the availability and flexibility of compressed air. A regulator valve in the compressed air line makes it possible to regulate and to change the applied pressure at will.

The amount of pressure applied to the pistons will be determined by and will, of course, be limited by the maximum force which can be applied to the plunger 13.

The following example will be helpful in illustrating the operation of the invention but is not to be construed as unduly limiting the invention.

*Example*

Thin walled articles were molded from solid polyethylene in an extrusion molding apparatus such as illustrated in FIGURE 1 wherein a force of about 20,000 p.s.i. could be applied to plunger 13. The diameter of gates 22 and 23 was $3/16''$. The diameter of the pistons 51 and 52 adjacent the gates 22 and 23 was $5/8''$. The diameter of the opposite ends of pistons 51 and 52 was $1\frac{1}{2}''$. Compresed air at about 275 p.s.i. was applied to the pistons so that plunger pressure of about 18,000 p.s.i. was required to move the pistons and open the gates to fill the mold cavities.

The polymer was therefore precompressed to very nearly the molding pressure so that filling of the mold cavity was accomplished very rapidly. Articles molded in this manner were entirely free from voids and displayed no evidence of internal stresses, e.g., absence of warpage and stress cracking. When similar thin walled articles were molded from polyethylene with a conventional injection molding apparatus, a considerable number of articles was discarded because of voids and other imperfections believed caused by premature hardening of the molten polymer flowing into the mold cavity.

It is desirable to preset the pressure applied to the pistons at as high a value as possible and still permit the plunger pressure to open the valves by overcoming the preset pressure applied thereto. The press utilized in the above example was capable of generating a plunger pressure of about 20,000 p.s.i.; however, some of this pressure is dissipated in friction in the heating cylinder. Therefore, in choosing the precompression pressure, allowance must be made for friction losses and other losses in pressure.

That which is claimed is:

1. In injection molding apparatus wherein a plastic material is heated and forced through a runner terminating in a gate opening into a mold comprising a cavity and a core, apparatus comprising a piston having an area greater than that of said gate positioned in an opening in the wall of said core directly opposite said gate; and means to apply a measure fluid pressure to said piston to tend to urge said piston into sealing contact with said gate.

2. In injection molding apparatus comprising a heating chamber, a mold cavity, a runner for passing molten plastic from said heating chamber and terminating in a gate opening into said mold cavity, and means to force molten plastic from said heating chamber into said mold cavity, apparatus comprising a cylinder formed in the wall of said mold cavity opposite said gate and having an opening in the mold cavity wall larger than that of said gate; a piston positioned in said cylinder in slidable, sealing contact with the wall of said cylinder so as to form a portion of the wall of said mold cavity when in retracted position; means to supply a preset fluid pressure to said cylinder to tend to urge said piston to extended positioned and into sealing contact with said gate at a positive pressure less than that employed to force molten plastic into said mold cavity.

3. In injection molding apparatus for molding simultaneously a plurality of thin-walled thermoplastic articles comprising a heating chamber, a plurality of mold cavities, runners for passing molten thermoplastic from said heating chamber and terminating in gates opening into the mold cavities, and means to force molten thermoplastic from said heating chamber through said runners and gates to said mold cavities at molding pressure, the combination therewith of a cylinder opening into the wall of each of said mold cavities directly opposite the gate and having an area greater than that of said gate; a piston slidably positioned in said cylinder so as to form a portion of the wall of said mold cavity; and means to supply a preset fluid pressure less than molding pressure to said piston to urge said piston into sealing contact with said gate.

References Cited in the file of this patent

UNITED STATES PATENTS

| 1,939,831 | Scheible | Dec. 19, 1933 |
| 2,345,917 | Coffman | Apr. 4, 1944 |
| 2,456,778 | Gilchrist | Dec. 21, 1948 |
| 2,470,402 | Jobst | May 17, 1949 |
| 2,637,073 | Waltner | May 5, 1953 |
| 2,770,011 | Kelly | Nov. 13, 1956 |
| 2,773,284 | Kelly | Dec. 11, 1956 |
| 2,777,164 | Strahm | Jan. 15, 1957 |
| 2,912,719 | Gilmore et al. | Nov. 17, 1959 |
| 3,012,280 | Scott et al. | Dec. 12, 1961 |

FOREIGN PATENTS

| 609,799 | Canada | Nov. 29, 1960 |

UNITED STATES PATENT OFFICE
CERTIFICATE OF CORRECTION

Patent No. 3,159,878                      December 8, 1964

John N. Scott, Jr., et al.

It is hereby certified that error appears in the above numbered patent requiring correction and that the said Letters Patent should read as corrected below.

Column 6, line 18, for "measure" read -- measured --; line 32, for "positioned" read -- position --.

Signed and sealed this 21st day of September 1965.

(SEAL)
Attest:

ERNEST W. SWIDER
Attesting Officer

EDWARD J. BRENNER
Commissioner of Patents